United States Patent [19]

Hayes

[11] Patent Number: 4,914,455

[45] Date of Patent: Apr. 3, 1990

[54] PROCESS CONTROL FOR ELECTROSTATOGRAPHIC PRINTERS

[75] Inventor: Thomas A. Hayes, Clifton Springs, N.Y.

[73] Assignee: Xerox Corporation, Stamford, Conn.

[21] Appl. No.: 387,259

[22] Filed: Jul. 31, 1989

[51] Int. Cl.[4] .......................................... G01D 15/00
[52] U.S. Cl. ...................................... 346/154; 346/160
[58] Field of Search ........... 346/154, 160, 107, 108 R, 346/76 L; 358/296, 298, 300, 302

[56] References Cited

U.S. PATENT DOCUMENTS

| | | | |
|---|---|---|---|
| 4,149,183 | 4/1979 | Pellar et al. | 358/75 |
| 4,196,451 | 4/1980 | Pellar | 358/283 |
| 4,390,882 | 6/1983 | Ohara et al. | 346/1.1 |
| 4,467,367 | 8/1984 | Ohara et al. | 358/298 |
| 4,626,923 | 12/1986 | Yoshida | 353/283 |
| 4,641,200 | 2/1987 | Shoji et al. | 358/296 |
| 4,661,859 | 4/1987 | Mailloux et al. | 358/283 |
| 4,700,206 | 10/1987 | Yamakawa | 346/160 |
| 4,717,925 | 6/1988 | Shibata et al. | 346/160 |
| 4,763,199 | 8/1988 | Suzuki | 358/280 |
| 4,782,398 | 11/1988 | Mita | 358/280 |
| 4,800,442 | 1/1989 | Riseman et al. | 358/280 |
| 4,811,037 | 3/1989 | Arai | 346/108 |

Primary Examiner—Arthur G. Evans
Attorney, Agent, or Firm—Frederick E. McMullen

[57] ABSTRACT

An electrostatographic printer with scanning laser beam for exposing a photoreceptor in accordance with image signals having black, white, and gray level image pixels, with a pulse-width modulator to modulate the beam when exposing gray level image pixels in response to current developing density as measured from the ac component of a combined ac/dc developer bias.

8 Claims, 12 Drawing Sheets

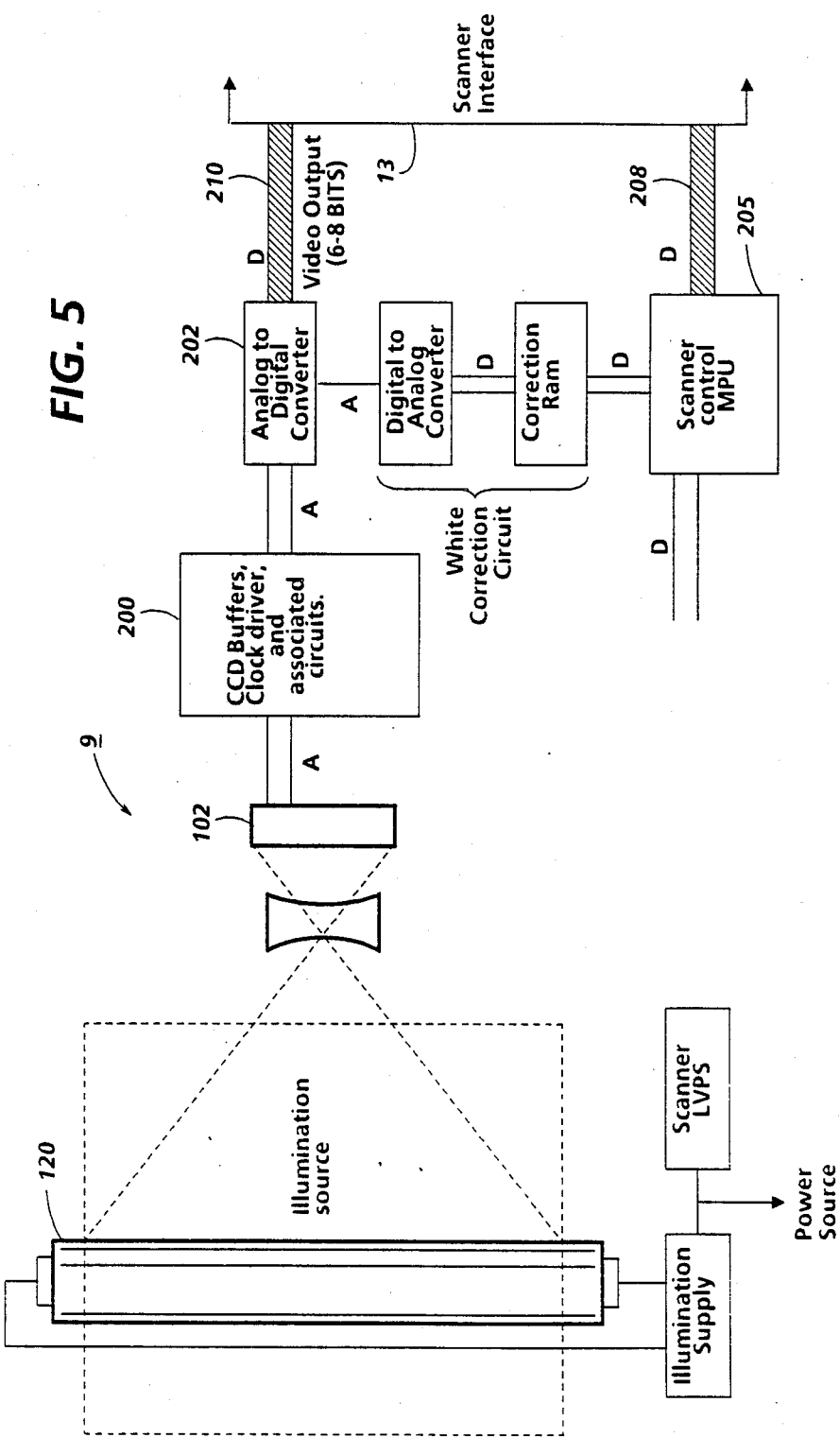

PROCESS CONTROL FOR ELECTROSTATOGRAPHIC PRINTERS

BACKGROUND OF THE INVENTION

The present invention relates to an electrostatographic printer, and more particularly, to an improved process control for controlling gray image level densities in an electrostatograpghic printer.

Electrostatographic printers typically employ a laser such as a laser diode as the vehicle for exposing the printer's photoreceptor, the laser being modulated in accordance with an image signal input as the beam is scanned across the photoreceptor line by line while the photoreceptor is moving in a direction perpendicular to the direction in which the beam is scanned. The dot-like image pattern created, which forms a duplicate of the image represented by the image signals, is thereafter developed, transferred to a substrate such as paper, and fixed as by fusing to provide a permanent copy or print.

The quality of the image produced depends on a number of factors, one important factor being resolution, i.e., the number of dots or spots laid down per unit of distance. Essentially, the higher the resolution, the more acceptable the image produced. And while only black and white image dots may be used, the image quality is improved by the use of one or more intermediate gray levels. In applications where this is done, the gray level or levels may be controlled by controlling the on-time of the laser. For example, in a write 'white' system, by maintaining the beam on longer, a larger portion of the image dot is exposed. This results in development of a lighter gray spot since the amount of toner is spread over a larger area. Similarly, where the beam on-time is curtailed, the area of the image spot exposed is less, leading to a higher concentration of toner in a smaller area, giving the impression of a darker spot. However, a problem with using one or more intermediate gray levels to improve image quality is the stability of the gray level output.

Where the printer employs an IR laser diode and IR sensitive photoreceptor, the development system used in that case may be a relatively simple single component type development system. In that type of development system, toner attraction is electro-voltic. Further, a high level of developer isolation is possible, the relationship between developer mass and the developer biasing current is optimized, and relatively high ac-to-dc current ratios are possible. And in view of the linear relationship that exists between DMA and developer current, and the high degree of developer isolation, in theory the dc component of the combined ac/dc developer bias should be usable to accurately monitor developer output density and control exposure so as to maintain a substantially constant gray level performance. Unfortunately, accurately isolating the dc component of the combined ac/dc developer bias has proved to be a problem.

PRIOR ART

In the prior art, Patent No. 4,641,200 to Shoji et al discloses an image reproducing apparatus using a laser to form images wherein the size of the dots constituting the images is controlled by varying the ac component in the developer bias. Patent No. 4,626,923 to Yoshida discloses an image processing apparatus in which the signal output of a pulse width modulation circuit is used to control the on-time of the laser in response to image input data, while Patent No. 4,390,882 to Ohara et al discloses a system for adjusting image density by controlling the on-time of the laser. Patent No. 4,661,859 to Mailloux et al discloses a system for producing pulses of controlled duration to drive a laser and produce discrete gray scale values, while Patent No. 4,700,206 to Yamakawa discloses an image forming apparatus in which the width of the image dots are controlled by controlling the on-time of a plurality of light emitting diodes.

Further, Patent Nos. 4,196,451 and 4,149,183 to Pellar disclose a pulse width modulating circuit wherein a halftone signal is produced by comparing a video image signal with a periodic waveform. Patent No. 4,782,398 to Mita discloses a circuit for generating a pulse width modulated signal from an analog signal source using dual triangular waveform generators and comparators, each producing a pulse width modulated signal, with a selector to select one of the signals for use. Patent No. 4,763,199 to Suzuki discloses a laser beam printer in which image signals in digital format are converted to analog and compared with a periodic triangular signal to obtain pulse width modulated and binarized image data, while Patent No. 4,800,442 to Riseman et al discloses a circuit for producing pulse width modulated signals for use informing halftone images with different pulse widths. And Patent No. 4,811,037 to Arai, discloses an image processing system with a pulse width modulating circuit having triangular wave generator, digital to analog converter, and comparator which produces signals representative of image gray levels.

SUMMARY OF THE INVENTION

In contrast, the present invention provides, in an electrostatographic printing machine having a photoreceptor, means providing a uniform charge on the photoreceptor, a laser providing an imaging beam modulated in accordance with an image signal input to produce image spots on the photoreceptor forming latent electrostatic images representative of the image signal input, the image signal input including black, white, and at least one gray image; scanning means for scanning the imaging beam across the photoreceptor; developer means for developing the latent electrostatic images; biasing means providing a bias to the developer means having ac and dc bias components; and means to transfer the developed images to a print medium, the combination of: means for repeatedly generating laser control signals; means for synchronizing the laser control signals with the image signals for input to the laser whereby to provide one laser control signal for each image signal; and control means for adjusting the duration of the laser control signals when producing gray images in response to the developing density of the developer means whereby to control the size of the image spots produced on the photoreceptor through exposure by the imaging beam in accordance with the developing density of the developer means.

BRIEF DESCRIPTION OF THE DRAWINGS

Other features of the present invention will become apparent as the following description proceeds and upon reference to the drawings in which:

FIG. 5 is a block diagram showing details of the scan control circuitry for the document input scanner;

DESCRIPTION OF THE PREFERRED EMBODIMENT

Figure 1:
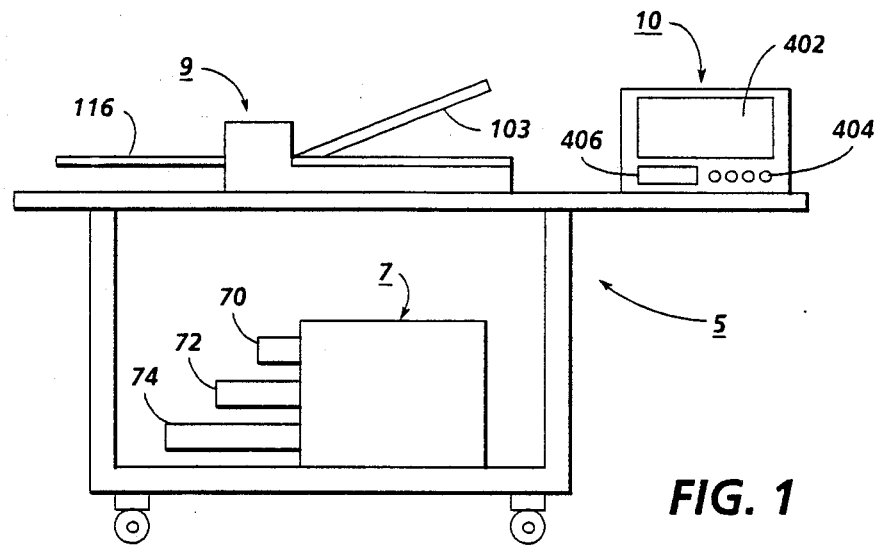
FIG. 1 is a view showing the principal components of a multifunction copier, printer, and facsimile machine of the type adapted to utilize the process control of the present invention.
Figure 4:
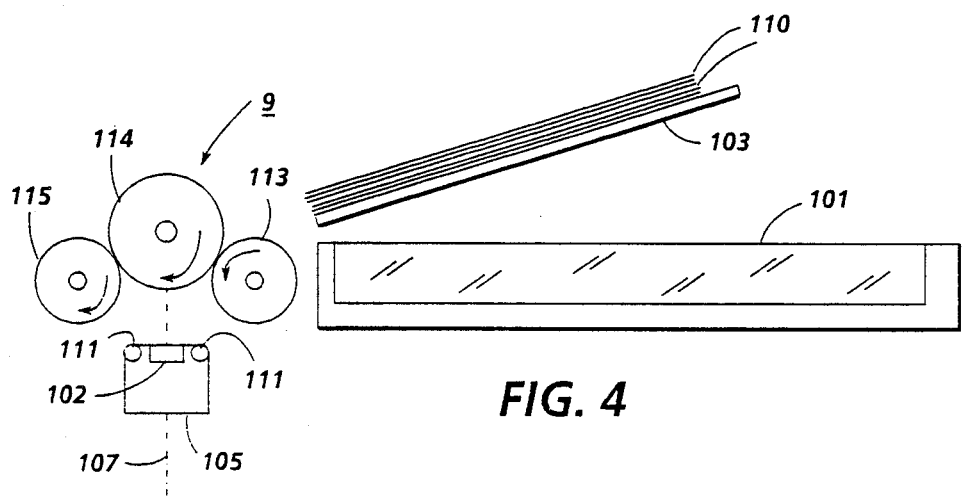
FIG. 4 is a more detailed view of the document input scanner for the machine shown in FIG. 1.
Figure 2:
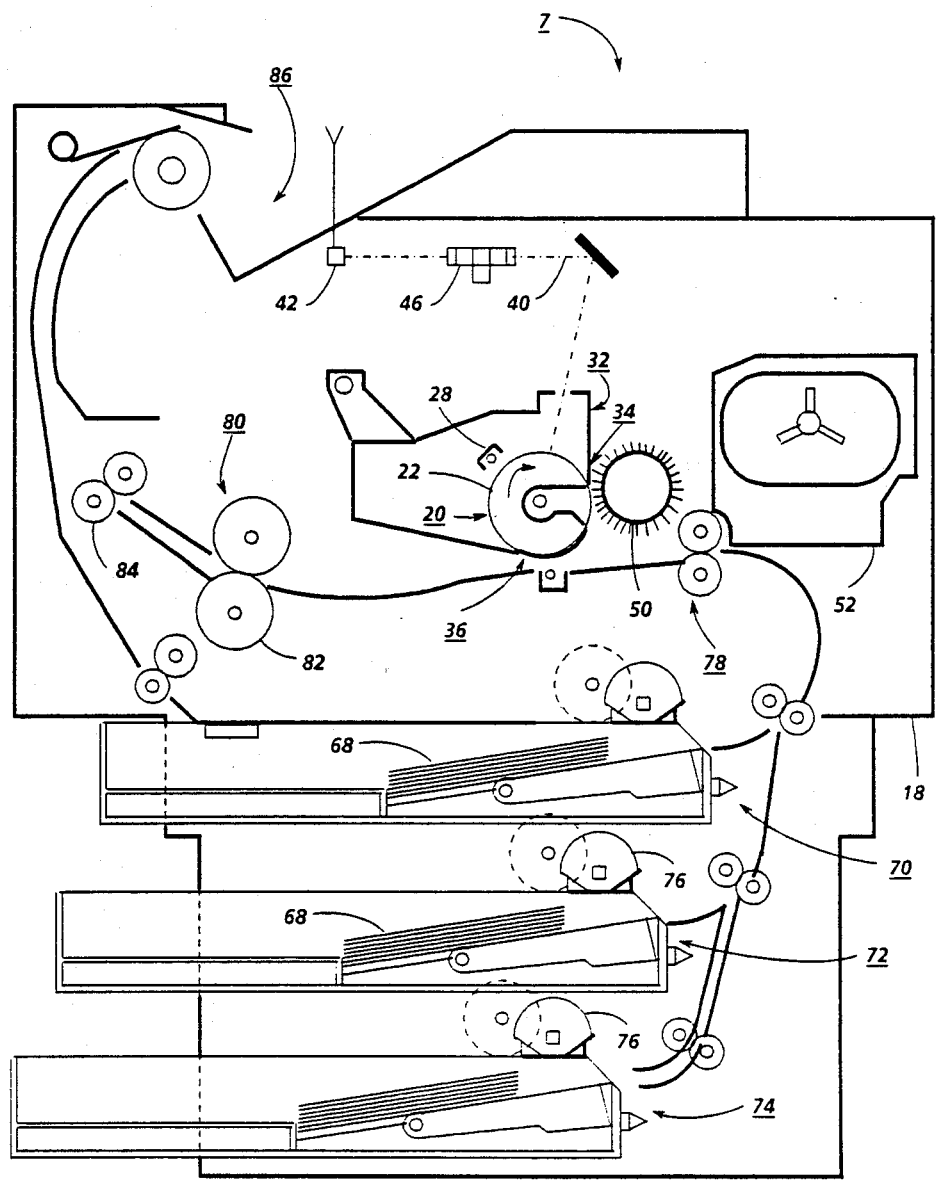
FIG. 2 is a view in cross section showing details of the laser printer for the machine shown in FIG. 1.
Figure 3:
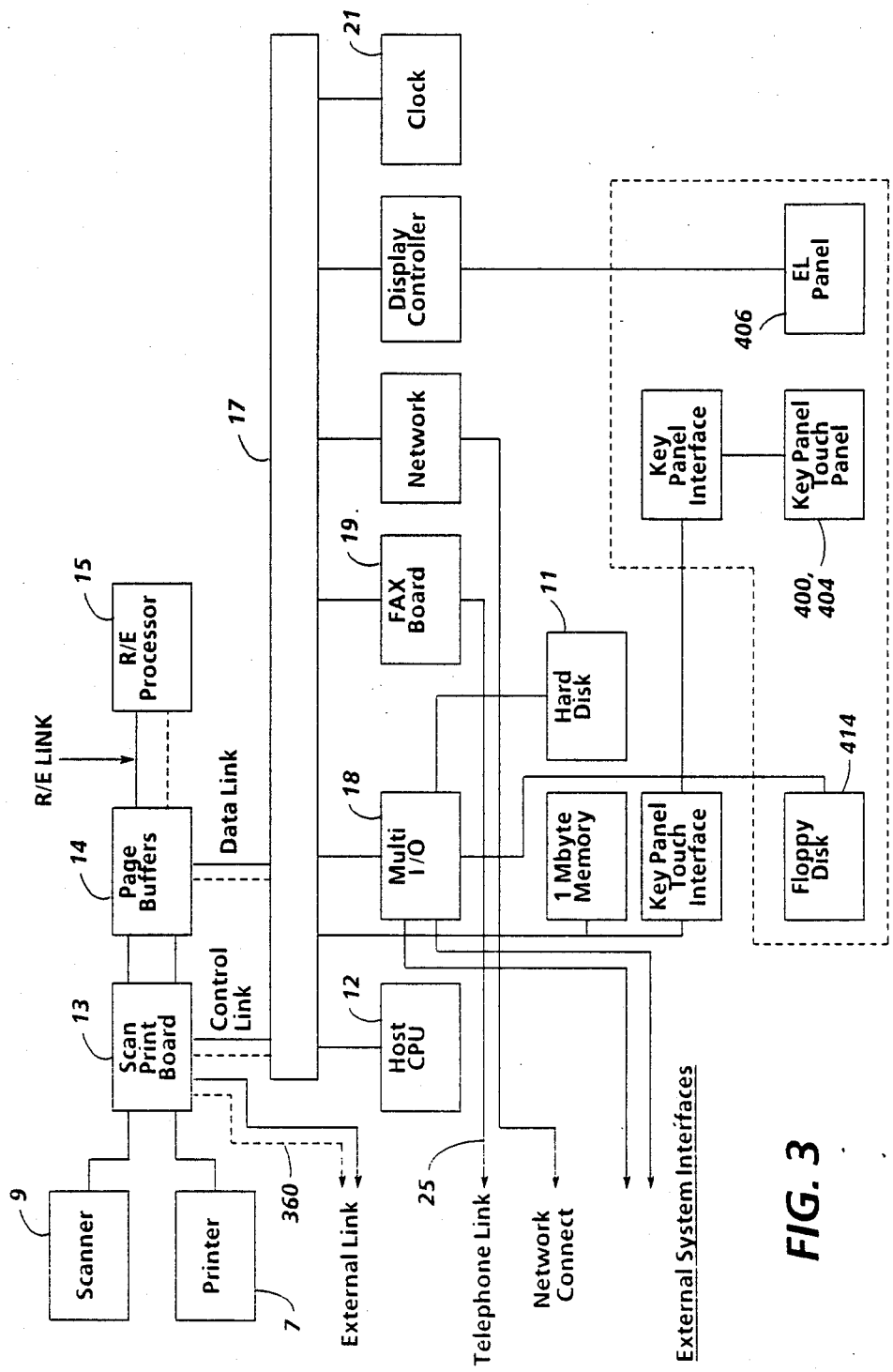
FIG. 3 is a block diagram showing the principal operating circuits for the machine shown in FIG. 1.

Referring now to FIGS. 1–4, there is shown by way of example a multi-function copier, printer, and facsimile machine, designated generally by the numeral 5, of the type adapted to incorporate the process control 330 of the present invention. It will, however, be understood that process control 330 may be used with other electrostatographic printer types and machines. Machine 5 has a laser printer 7 and document scanner 9 together with touch panel type User Interface (UI) 10 for controlling and programming machine operation. A hard disk 11 provides memory for storing machine control and image data, the latter being in the form of video image signals. The machine control system includes a host computer 12, a scan/print Printed Wiring Board (PWB) 13, page buffers 14, and Reduction/Enlargement (R/E) processor 15. A data channel 17, which provides a transmission path for control data and video image signals, is coupled to scan/print PWB 13 and page buffers 14. A multi-port I/O section 18 couples data channel 17 with UI 10 and provides coupling to other external system data sources as well as disk 11. A fax PWB 19, which couples data channel 17 with suitable communications links such as telephone line 25, enables facsimile transmission and reception. Machine 5 may be connected to serve as a printer when connection is established with a single workstation, multiple workstations, or a local area network.

Printer 7 includes a photoreceptor drum 20, the outer surface 22 of which is coated with a suitable photoconductive material, and a charge corotron 28 for charging the drum photoconductive surface 22 in preparation for imaging. Drum 20 is suitably journaled for rotation within the machine frame 35, drum 20 rotating in the direction indicated by the arrows to bring the photoconductive surface thereof past exposure, developer, and transfer stations 32, 34, 36 of printer 7.

In the xerographic process practiced, the photoconductive surface 22 of drum 20 is initially uniformly charged by charge corotron 28, following which the charged photoconductive surface 22 is exposed by imaging beam 40 at exposure station 32 to create an electrostatic latent image on the photoconductive surface 22 of drum 20.

Figure 9:
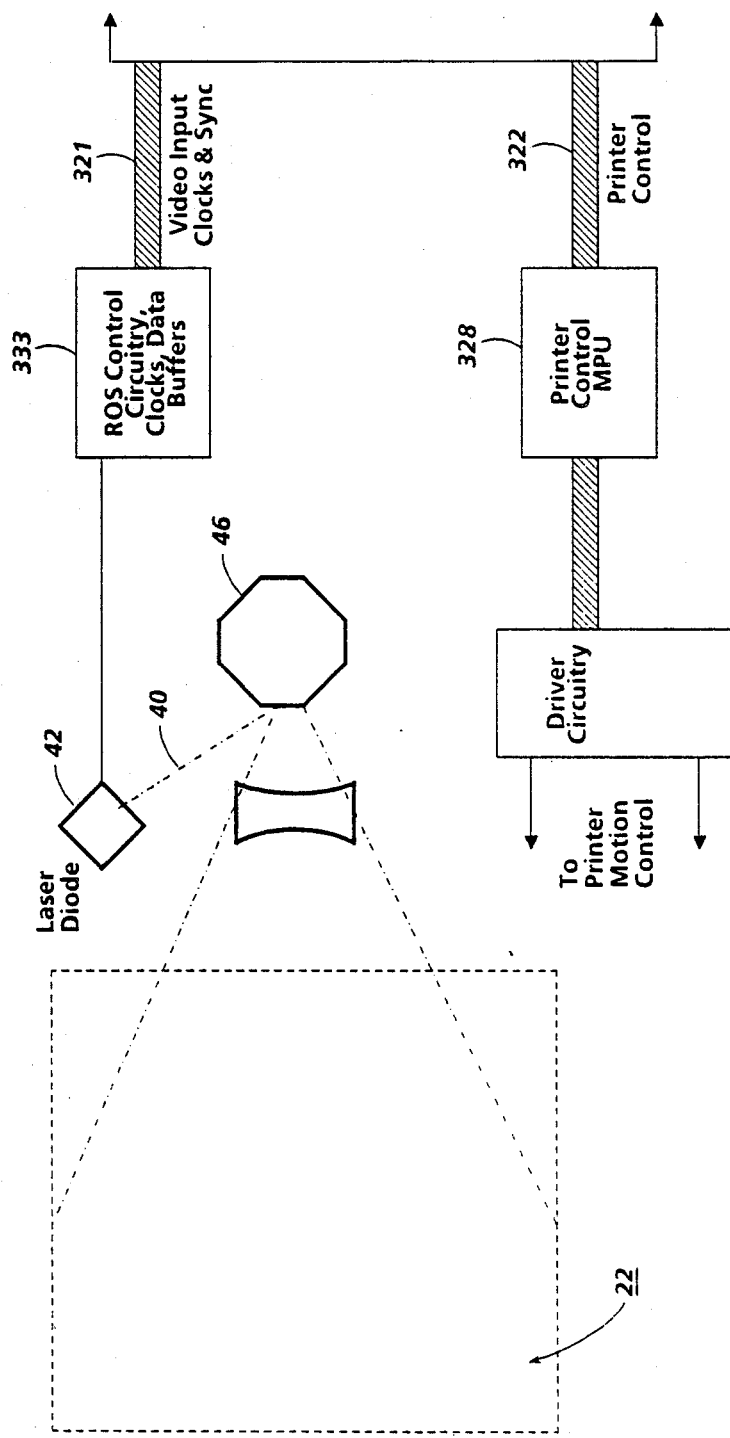
FIG. 9 is a block diagram showing details of the scan control circuitry for operating the printer.

Referring also to FIG. 9, imaging beam 40 is derived from a laser diode 42 modulated in accordance with video image signals from scan/print PWB 13. Image signals may be provided by scanner 9, disk 11, or from a suitable external source through multi-port I/O section 18, fax PWB 19, or any other suitable interconnection. The modulated imaging beam 40 output by laser diode 42 is impinged on the facets of a rotating multifaceted polygon 46 which sweeps the beam across the photoconductive surface 22 of drum 20 at exposure station 32.

Following exposure, the electrostatic latent image on the photoconductive surface 22 of drum 20 is developed at developer station 34 by a single component magnetic brush development system that includes a rotatable magnetic brush roll 50 in developing relation with the surface 22 of drum 20. Single component developer is supplied to magnetic brush roll 50 from a developer housing 52.

Prints or copies are produced on a suitable support material, such as copy sheets 68. A supply of copy sheets 68 is provided by paper trays 70, 72, 74, trays 70, 72, 74 each having a feed roll 76 for feeding one sheet at a time from the stack of sheets in the tray to a pinch roll pair 78 where the sheet is registered with the image developed on drum 20. Following registration, the sheet is forwarded to transfer station 36 where the developed image is transferred from photoconductive surface 22 to the copy sheet 68. Following transfer, the copy sheet bearing the toner image is separated from the photoconductive surface 22 of drum 20 and advanced to fixing station 80 wherein roll fuser 82 fuses or fixes the transferred powder image thereto. After fusing, the finished copy or print is advanced by print discharge rolls 84 to print output tray 86.

Any residual toner particles remaining on the photoconductive surface 22 of drum 20 after transfer is removed by a suitable cleaning mechanism (not shown).

Document scanner 9 is a dual mode scanner, permitting either manual scanning operation in which a document 110 to be scanned is manually placed upon a transparent platen 101 or automatic scanning in which one or more documents to be scanned are placed on inclined document feed tray 103. Scanner 9 has a CCD type contact array 102 disposed on a movable scan carriage 105. Carriage 105 is suitably supported for reciprocating back and forth scanning movement below platen 101, carriage 105 moving from a home or park position 107 adjacent one end of platen 101 to the opposite end and back. Lamps 111 on carriage 105 illuminate the document line being scanned. A hinged cover is provided to close platen 101 during manual scanning and to cover and protect the platen when not in use.

For automatic scanning operating, scan carriage 105 is retained in the park position 107 and the document(s) to be scanned, which rest on inclined document feed tray 103, are transported one by one past array 102 by means of document feed rolls 113, 114, 115. Feed rolls 113, 114, 115 cooperate to form nips upstream and downstream of the scan point. The scanned document(s) are deposited onto a discharge tray 116 (seen in FIG. 1) for removal.

Referring to FIG. 5, the photo-electrical charge signals output by array 102 of scanner 9 are buffered by buffer 200 while the signals are processed following which the signals are converted to digital by A/D converter 202. Local control of scanner 9 is provided by a controller 205. Scanner 9 is interfaced with scan/print PWB 13 by communications port 208 and video output port 210, the latter carrying pixel clock, line sync, and page sync signals in addition to the video image data.

Figure 6:
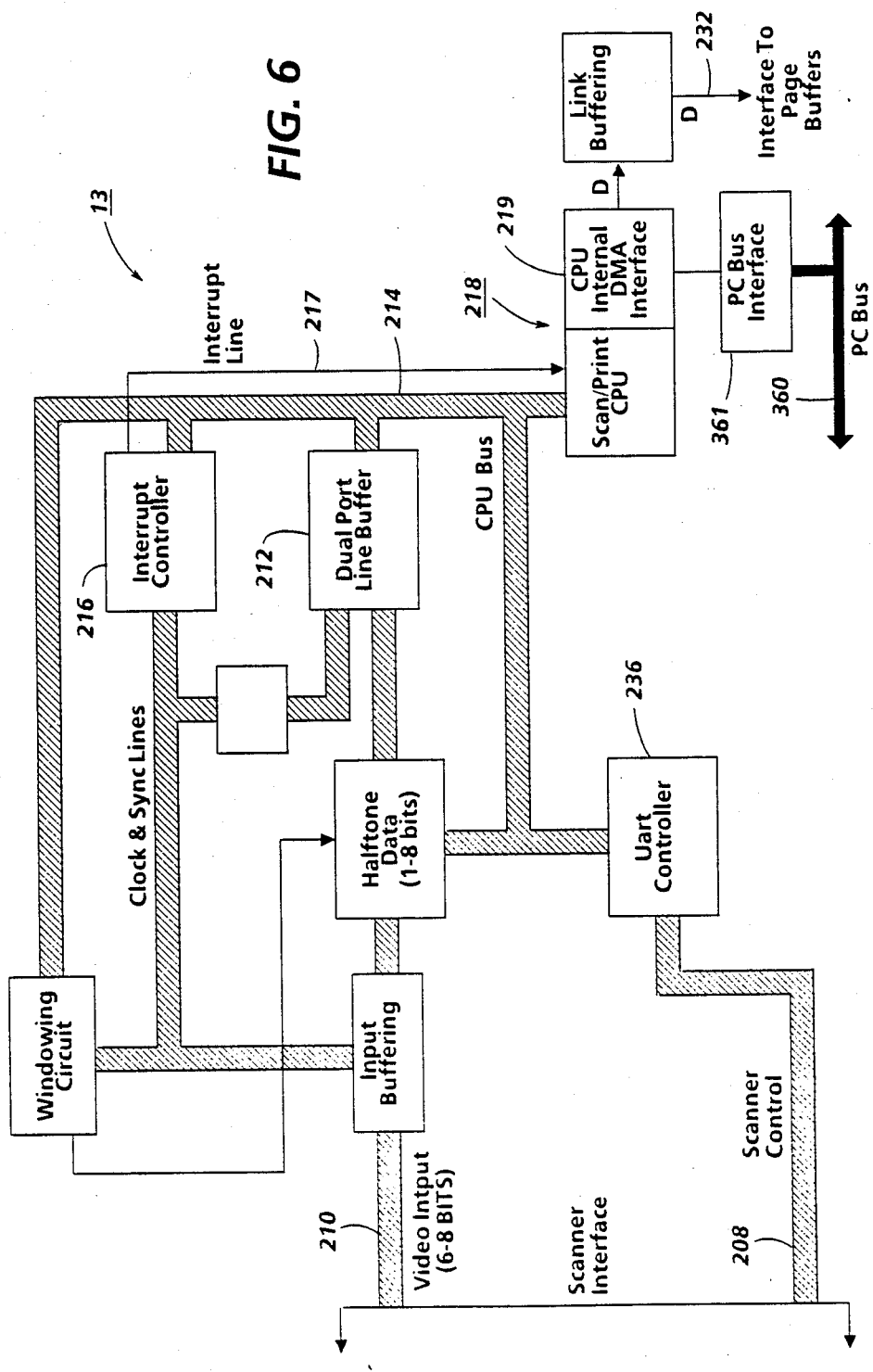
FIG. 6 is a block diagram of the circuitry for processing image signals output by the document input scanner.
Figure 7:
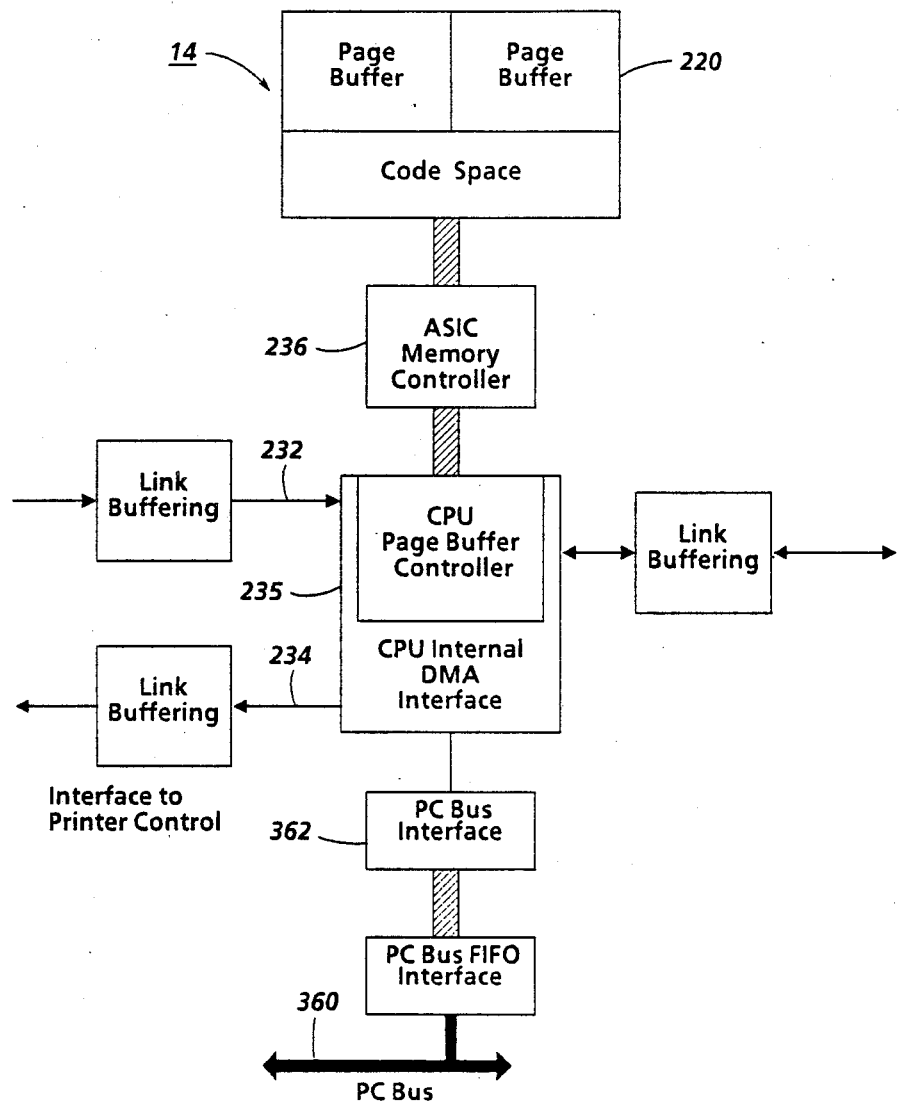
FIG. 7 is a block diagram of the page buffer circuitry for storing image signals.

Referring to FIGS. 6 and 7, the video image signals output by scanner 9 are stored in sequential order in one side of dual port line buffer 212 of scan/print PWB 13. A processor bus 214 is tied to the other side of buffer 212. As each image line from scanner 9 is completed, an interrupt controller 216 responds and outputs an interrupt signal via line 217 to the internal DMA interface 219 of a transputer 218 causing transputer 218 to read an image line out of buffer 212.

The image line is sent to a buffer 220 of page buffers 14 by a 'link' protocol built into transputer 218. The link protocol allows for automatic asynchronous transfers of large amounts of video data with no processor overhead. By using separate links 232, 234 under the control of page buffer controller 235, one for transferring image data from scanner 9 to page buffers 14 and the other for transferring image data from page buffers 14 through transputer 236 (seen in FIG. 8) to printer 7, very high image data transfer rates are achieved, allowing both printer 7 and scanner 9 to operate at the same time. Further, the asynchronous nature of links 232, 234 allows printer 7 and scanner 9 to run at different speeds and image sizes.

Figure 8:
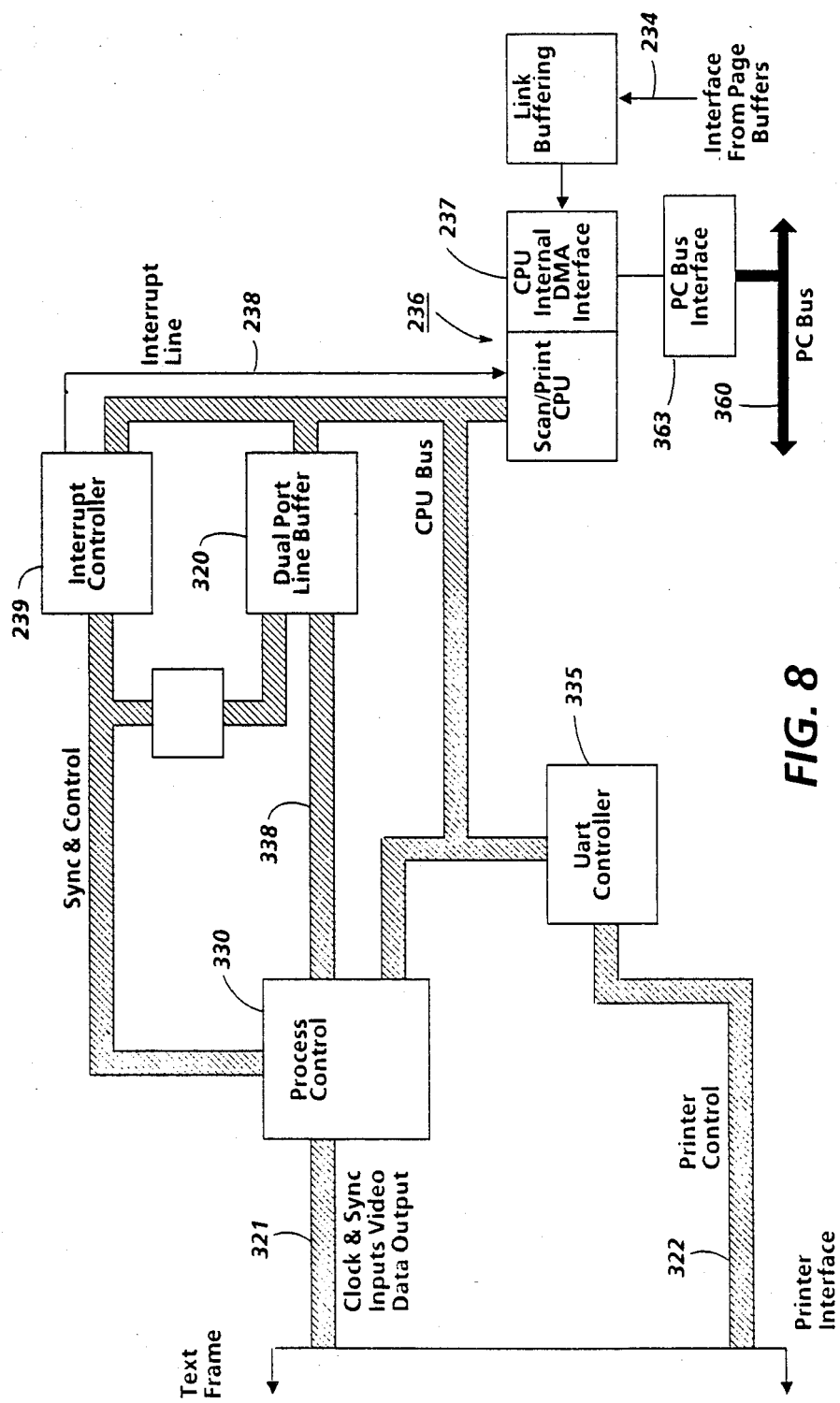
FIG. 8 is a block diagram of the circuitry for processing image signals for printing by the printer.

Referring to FIGS. 7-9, image data is output to printer 7 from page buffers 14 over link 234 in substantially the same manner as image data is received from scanner 9. On a request for a page, printer 7 cycles up and provides pixel clock, line sync, and page sync signals. During each line sync signal, transputer 236 programs internal DMA interface 237 in response to an interrupt signal from interrupt controller 239 through interrupt line 238 to read out a specific number of image signal bytes from page buffers 14 into one side of dual port line buffer 320. From buffer 320, the image signals are input to the process control 330 of the present invention where the image gray level is adjusted.

The processed video image signals output by control 330 together with pixel clock, line sync, and page sync signals are transmitted to printer 7 through video output port 321 and control circuit 333 to diode 42. Control information for printer 7 is transmitted to the printer control 328 from controller 335 via a communications port 322. Printer control 328 controls all paper handling, xerographic, and video control functions of printer 7. In addition, diagnostics and component control functions can be accessed. Once a page is requested, printer 7 cycles up and provides pixel clock, line sync, and page sync as outputs for synchronizing the video image signals sent to laser 42 for imaging onto drum 20.

As seen in FIGS. 6-8, transputers 218, 236 and page buffer 220 may be interfaced with an external data source or printer such as a Personal Computer (PC) through a bus 360 and bus interfaces 361, 362, 363. Interrupt controllers 216, 239 of scan print PWB 13 allow transputers 218, 236 to respond to real time event requests (line sync, scan sync, page sync, communications, etc.) from the outside source. Each interrupt is maskable in hardware to lock out either the scanner or printer interrupts.

Figure 10:
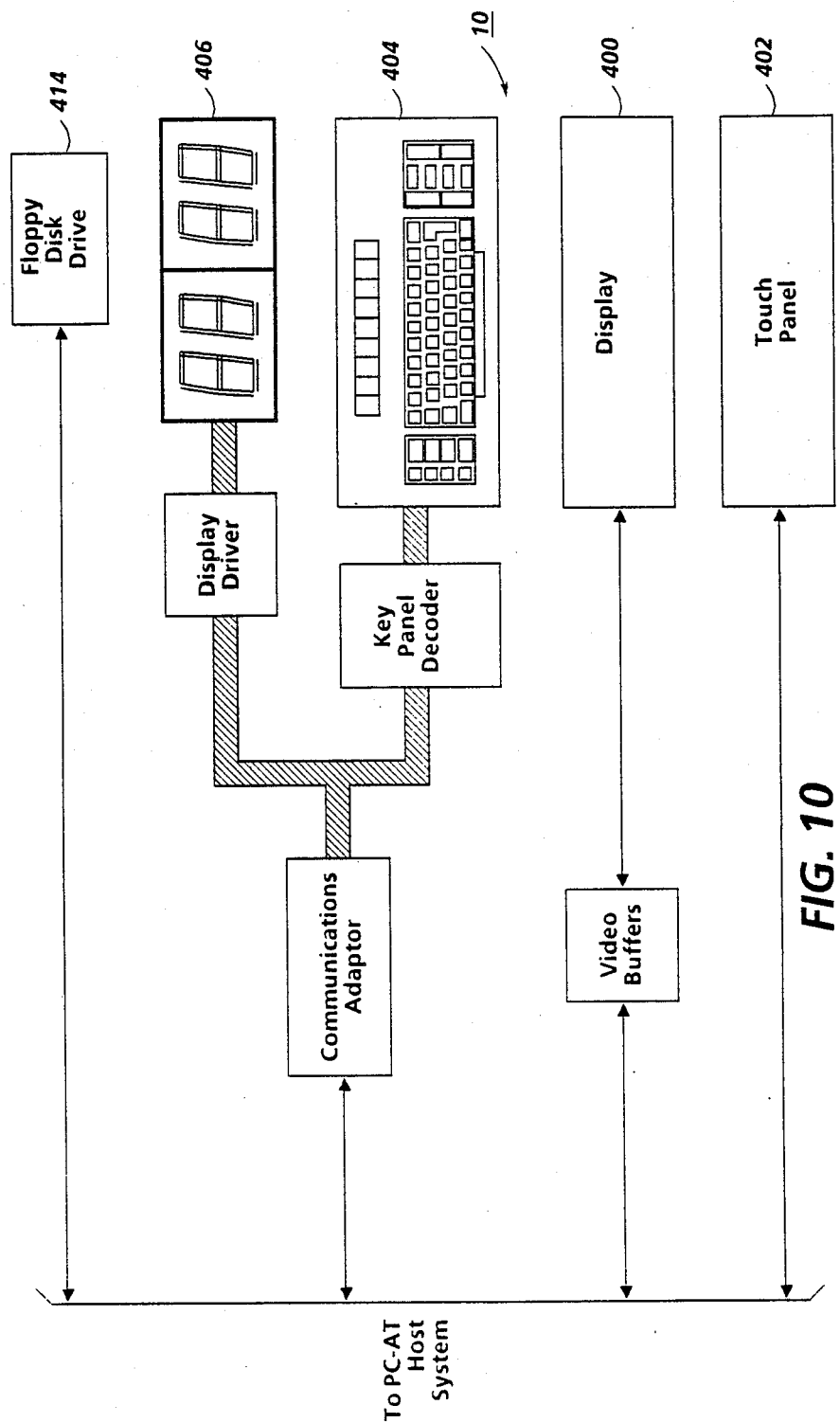
FIG. 10 is a block diagram showing the principal components of the User Interface for the machine shown in FIG. 1.

Referring to FIG. 10, UI 10 includes a display 400 with pressure type touch panel overlay 402. Display 400 displays operator selections and machine operating data in the form of icons or pictograms and alpha numeric characters. These provide various operator selections for programming the machine 5 and informational messages and instructions such as identifying machine faults, providing diagnostic instructions, etc. Additionally, a key panel 404 and LED display 406 are provided. Additional control and informational displays and/or other display types may be contemplated.

To enable software programs to be written to or read from hard disk 11 through the mechanism of floppy disks, a suitable floppy disk drive 414 with suitable R/W head is provided. By using floppy disks, users can input print jobs directly rather than by a network. Additionally system software updates, fonts, and custom drivers etc. may also be loaded by the floppy disks.

Figure 11A:
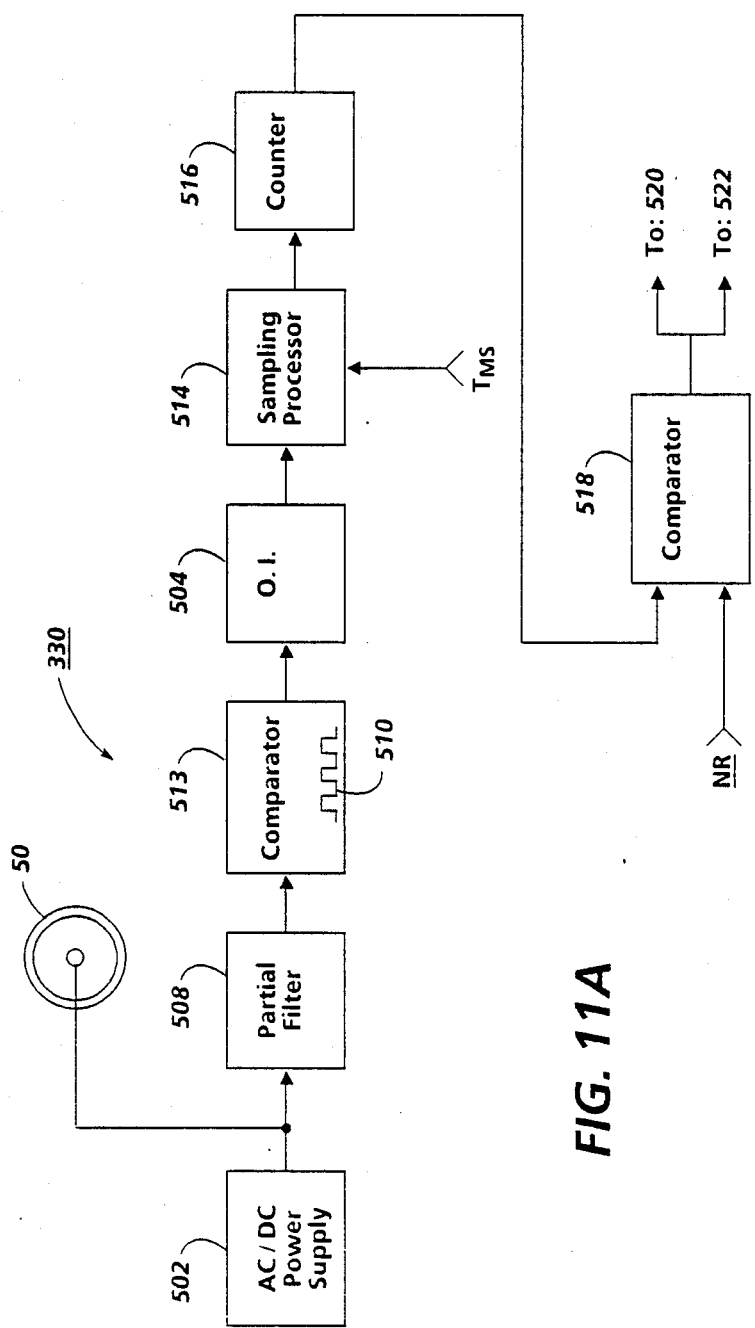
FIGS. 11a and 11b are schematic views showing the principal operating circuits of the process control of the present invention.
Figure 11B:
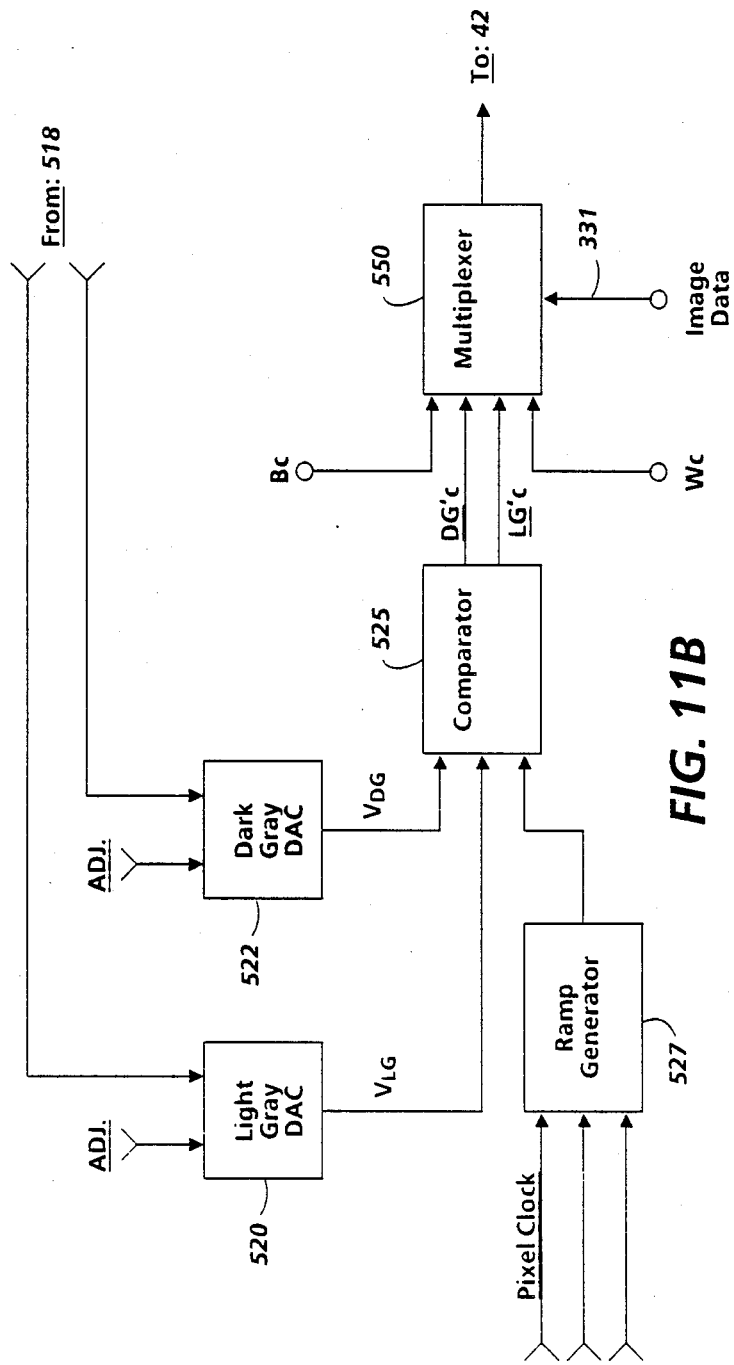

Referring to FIGS. 11a and 11b, the developer bias Vbias applied to mag brush roll 50 comprises a combination ac (Vac) and dc (Vdc) bias derived from a suitable ac/dc power supply 502.

Process control 330 of the present invention controls the size, i.e., the width of the image stripe laid down on photoreceptor 20 by imaging beam 40 in response to the level of the dc bias component Vdc in the combined ac/dc developer bias Vbias applied to mag brush roll 50. To measure the dc bias component Vdc on mag brush roll 50, it is ordinarily desirable to filter out the ac component Vac of the developer bias Vbias. However, to filter out all of the ac component in the developer bias, a filter with a long time constant is required. Since the time constant of the filter would be greater than the time taken to process an image, complete filtering is impractical. Process control 330 instead employs a partial filter 508 which serves only to partially filter the ac component Vac of the developer bias Vbias, leaving a small amount of ac ripple in the filtered signal. The ac ripple output by filter 508 is input to a comparator 513 which provides a square waveform ac signal 510. As will appear, the ac signal 510 is used to measure the dc developer bias component $V_{dc}$. To isolate power supply 502, optical isolator (OI) 504 is provided.

The optimum value for the developer bias dc component $V_{dc}$ is $V_{op}$. Where $V_{dc}$ is at the optimum value, the filtered ac component $V_{ac}$ has a 50% duty cycle. Where the duty cycle of the ac component $V_{ac}$ is greater than 50%, the developer bias dc component $V_{dc}$ is above the optimum $V_{op}$ value. Where the duty cycle of the ac component $V_{ac}$ is less than 50%, the developer bias dc component $V_{dc}$ is below the optimum $V_{op}$ value.

To determine whether the developer bias dc component $V_{dc}$ is above or below the target level of $V_{op}$, the ac signal 510 is input to sampling processor 514 which samples the signal N times over a timed period of T ms. Where the ac signal 510 is greater than 1, a signal from processor 514 increments a counter 516 by 1. Where the ac signal 510 is less than 1, counter 516 is not incremented and the count remains unchanged.

Following expiration of the timed period T ms, the count on counter 516 is compared by a comparator 518 with a reference count NR representative of the 50% duty cycle. Where the count is less than reference count NR, the developer bias dc component $V_{dc}$ is below the optimum value of $V_{op}$. Where the count is greater than reference count NR, the developer bias dc component $V_{dc}$ is above the optimum value of $V_{op}$.

Figure 12:
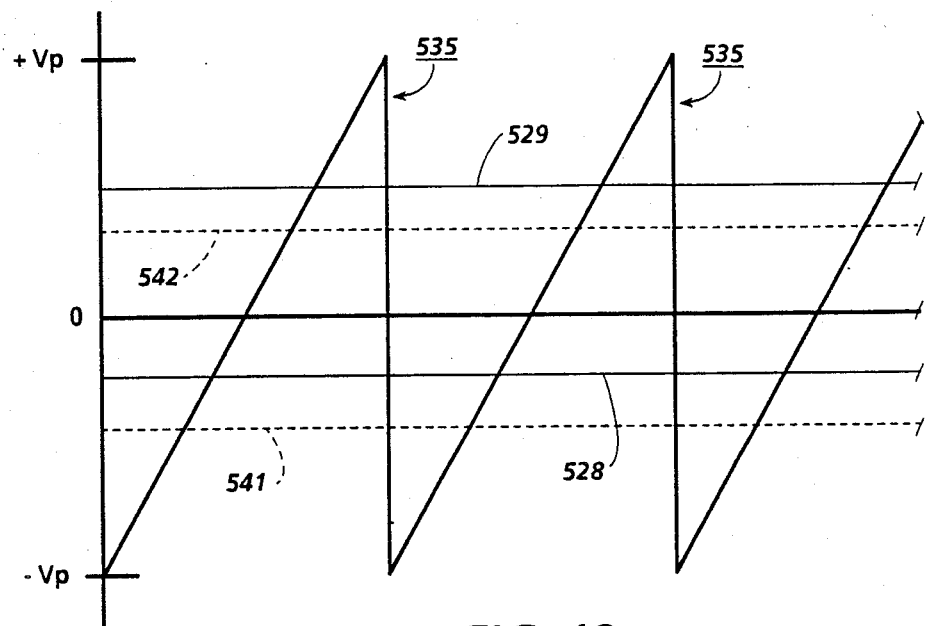
FIG. 12 is a graph depicting the sawtooth wave output of the ramp generator circuit shown in FIG. 11b together with light gray and dark gray signal waves superimposed thereon.

Referring also to FIG. 12, the signal from comparator 518 is input to the control gates of light gray and dark gray Digital-to-Analog Converters (DACs) 520, 522 which provide light gray ($V_{LG}$) and dark gray ($V_{DG}$) analog voltages for controlling the on-time of imaging beam 40. DACs 520, 522 also have independent adjustment (Adj) for use for example by the operator, tech rep, etc. to optimize the light and dark gray pixel spot sizes. The light gray ($V_{LG}$) and dark gray ($V_{DG}$) analog voltages output by DACs 520, 522 as adjusted by the signal from comparator 518 (exemplified by dotted lines 541 and 542 in FIG. 12) are fed to high speed comparator 525. There, light gray ($LG_C$) and dark gray ($DG_C$) beam control signals have a pulse width determined by comparing the light gray ($V_{LG}$) and dark gray ($V_{DG}$) voltages output by DACs 510, 512 with ramp signals from a ramp generator circuit 527 are derived. As will appear, the light gray and dark gray beam control signals control the on-time of beam 40 to control the size of the light gray and dark gray pixel spots.

Figure 13:
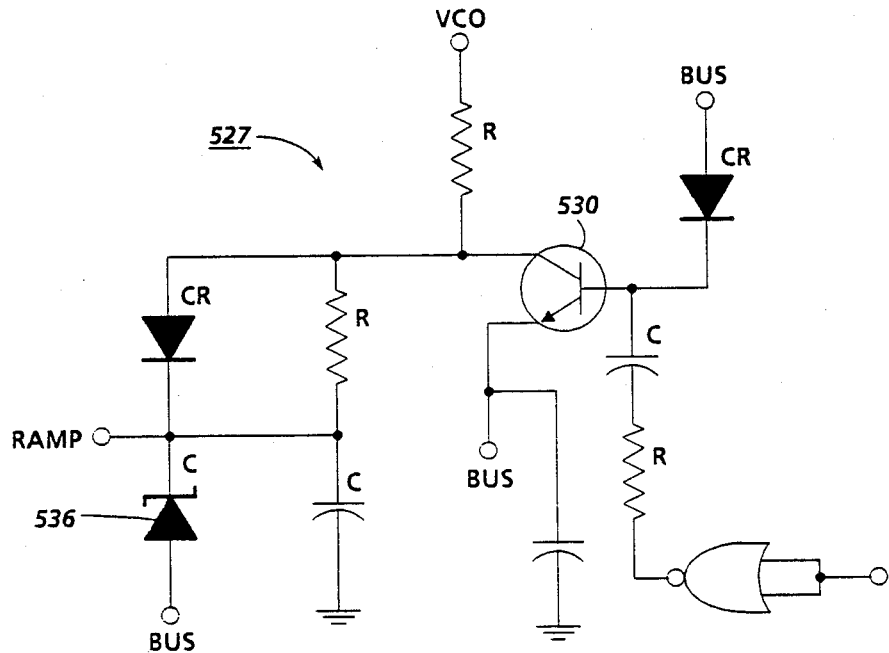
FIG. 13 is a view showing details of the ramp generator circuit shown in FIG. 11b.

Referring additionally to FIG. 13, ramp generator circuit 527 with reset gate 530 controlled by pixel clock signals from clock 21 (seen in FIG. 3), outputs a succession of ramp signals 535 in the form of a sawtooth wave in phase with the pixel clock signals. Circuit 527 employs a close coupled RF design with zener diode 536 to insure peak voltage stability.

As shown in FIG. 12, peak voltages of wave 535 swing between $-Vp$ volts to $+Vp$ volts. The nominal light gray and dark gray voltages shown by lines 528 and 529 respectively provide light gray and dark gray beam control signals designed to produce optimum light gray and dark gray pixel spot sizes.

The ramp signals 535 of ramp generator circuit 527 are input to comparator 525 where the signals are compared with the light gray and dark gray voltages ($V_{LG}$, $V_{DG}$) output by DACs 520, 522 as adjusted by the current value of the dc component of the developer bias. Where the current light gray voltage of DAC 520 (shown by dotted line 541 in FIG. 12) is less than the nominal setting (exemplified by line 528), the pulse width of the beam control signal ($LG_C$) derived from ramp signal 535 and output by comparator 525 is extended, increasing the on-time of laser beam 40 and hence increasing the width of the light gray pixel spot laid down on photoreceptor 20. Where the current dark gray signal output by DAC 522 (shown by the dotted line 542 in FIG. 12) is less than the nominal setting (exemplified by line 529), the pulse width of the beam control signal ($DG_C$) output by comparator 525 is extended, increasing the on-time of laser beam 40 and hence increasing the width of the dark gray pixel spot laid down on photoreceptor 20. In these instances, the darkness of the pixel as perceived by the human eye is reduced since the amount of developer is spread out over a larger area and hence less concentrated.

Alternately, where the light gray voltage output by DAC 520 is greater than the nominal setting, the pulse width of the beam control signal ($LG_C$) output by comparator 525 is reduced, reducing the on-time of laser beam 40 and hence decreasing the width of the light gray pixel spot laid down on photoreceptor 20. Where the dark gray voltage output by DAC 522 is greater than the nominal setting, the pulse width of the beam control signal ($DG_C$) output by comparator 525 is reduced, reducing the on-time of laser beam 40 and hence reducing the width of the dark gray pixel spot laid down on photoreceptor 20. In these instances, the darkness of the pixel as perceived by the human eye is increased since the amount of developer is more heavily concentrated in a smaller area.

The light gray and dark gray ramp signals $LG_C$ and $DG_C$ are input to a multiplexer 550. Multiplexer 550 also has preset black ($B_c$) and preset white ($W_C$) beam control signals input thereto controlling the on-time of laser 42 for black and white pixel spot sizes. It is understood that the black and white pixel sizes are normally fixed and hence are not adjusted by the process control of the present invention. Multiplexer 550 selects the image type (i.e., black, white, light gray, dark gray) in accordance with the image signals input thereto through data line 331 and output the appropriate beam control signal, i.e., black ($B_c$), white ($W_C$), light gray ($LG_C$), or dark gray ($DG_C$) to laser 42.

To maintain a constant gray level output, printer 7 and control system 12 are operated at discrete times such as when machine 5 is first started, etc., to run a series of test prints. Imaged onto the prints are stripes of two different preset widths, one for light gray pixels; the other for dark gray pixels. Process control 330 responds to the developer bias measured to adjust the on-time of imaging beam 40 for the light gray and dark gray image pixels.

As a result, a constant output density is achieved for each level of gray regardless of temperature, humidity, or materials changes.

While process control 330 is disclosed in connection with a 'write white' type scanner, it will be understood that process control 330 is equally suited for operation with a 'write black' type scanner. Further, it will be understood that while process control 330 has been described in connection with light gray and dark gray pixel spot sizes, process control 330 may be used to control a single level of gray, or additional levels of gray over and above the two levels described.

While the invention has been described with reference to the structure disclosed, it is not confined to the details set forth, but is intended to cover such modifications or changes as may come within the scope of the following claims.

I claim:

1. In an electrostatographic printing machine having a photoreceptor, means providing a uniform charge on said photoreceptor, a laser providing an imaging beam modulated in accordance with an image signal input to produce image spots on said photoreceptor forming latent electrostatic images representative of said image signal input, said image signal input including black, white, and at least one gray image; scanning means for scanning said imaging beam across said photoreceptor; developer means for developing said latent electrostatic images; biasing means providing a bias to said developer means having ac and dc bias components; and means to transfer said developed images to a print medium, comprising, in combination:

(a) means for repeatedly generating laser control signals for operating said laser;

(b) means for synchronizing said laser control signals with said image signal input whereby to provide one laser control signal for each image signal; and (c) control means for adjusting the duration of said laser control signals when producing said gray images in response to the developing density of said developer means whereby to control the size of the image spots produced on said photoreceptor through exposure by said imaging beam in accordance with the developing density of the developer means.

2. The machine according to claim 1 in which said control means provides laser control signals of different durations for each of said black, white, and gray images.

3. In a raster scanner having a laser beam for generating black, white, and gray image pixels on a recording member in response to image signals whereby to form latent electrostatic images in accordance with said image signals, with developer means for developing said latent electrostatic images, comprising, in combination:
   (a) means for generating a succession of pulse-like signals for use in modulating said laser;
   (b) means for synchronizing said pulse-like signals with said image signals to provide synchronized signals; and
   (c) control means for deriving laser control signals of different duration for each of said black, white, and gray image pixels from said synchronized signals;
   (d) said control means including means for varying the duration of said laser control signals for said gray image pixels in response to the developing density of said developer means.

4. The scanner according to claim 3 in which said control means includes developing density monitoring means for monitoring said image developing density.

5. The scanner according to claim 4 in which said scanner includes means for applying a bias to said developer means, said bias including ac and dc bias voltages;
   said monitoring means including means for processing said ac bias voltage to provide an ac ripple signal representative of said ac bias voltage; and
   comparator means for comparing said ac ripple signal with a reference signal representing predetermined developing density;
   said control means varying the duration of said laser control signals for said gray image pixels in response to the signal output of said comparator means.

6. In an electrostatographic reproduction machine have a movable photoreceptor; charging means for placing a uniform electric charge on said photoreceptor; exposure means for exposing said charged photoreceptor to create latent electrostatic images thereon, said exposure means including a laser providing an imaging beam for generating discrete patterns of image pixels on said photoreceptor and a rotatable scanning element for raster scanning said beam across said photoreceptor in response to image signals, and developer means for developing the latent electrostatic images produced on said photoreceptor; biasing means providing a bias to said developer means; transfer means for transferring developed images from said photoreceptor to a copy or print substrate; and fixing means for fixing said transferred images to said substrate, the combination of;
   (a) means for monitoring the developing density of said developer means; and
   (b) control means responsive to the image content of said image signals for controlling said laser whereby said imaging beam selectively produces black, white, and at least one gray level pixel on said photoreceptor, said control means including
      (1) signal generating means producing successive ramp signals for input to said laser to control the on-time of said laser,
      (2) means for synchronizing generation of said ramp signals with said image signals, and
      (3) adjusting means for adjusting the length of the ramp signals for said gray level pixels in response to said developer means developing density to control the on-time of said laser and the size of said gray level pixels whereby to maintain substantially constant gray level pixel densities despite changes in developing density.

7. The machine according to claim 6 in which said control means includes
   (a) monitoring means providing a reference signal representative of said bias to said developer means;
   (b) said adjusting means adjusting said ramp signals in response to changes in said reference signal.

8. The machine according to claim 7 in which said bias includes ac and dc components
   (a) said monitoring means including means for processing said ac component to provide an ac signal representative of said reference signal; and
   (b) means responsive to the frequency of said ac signal for adjusting said developer biasing means.

9. A process for controlling gray level pixel densities in an electrostatographic reproduction machine having a photoreceptor on which latent electrostatic images are created by a scanning beam of high intensity energy modulated in accordance with image signals; developer means including at least one magnetic brush and ac/dc bias means for placing a predetermined ac/dc developer bias on said brush; transfer means for transferring the images developed on said photoreceptor to a copy substrate material; and fixing means for rendering said transferred image permanent; comprising the steps of:
   (a) processing said developer bias to provide an ac signal representative of said dc developer bias;
   (b) counting the number of times in a predetermined timed interval that said ac signal exceeds a preset signal level;
   (c) comparing the count obtained in step b with a reference count equivalent to desired developer density;
   (d) where said count is less than said reference count, decreasing the on-time of said beam to decrease the size of the pixel spot whereby to increase image density; and
   (e) where said count is greater than said reference count, increasing the on-time of said beam to increase the size of the pixel spot and decrease image density.

* * * * *